(12) United States Patent
Berreth et al.

(10) Patent No.: US 6,666,310 B1
(45) Date of Patent: Dec. 23, 2003

(54) FIBRE-REINFORCED CERAMIC BODY AND METHOD FOR PRODUCING SAME

(75) Inventors: Karl Berreth, Remshalden (DE); Marcus Speicher, Riegelsberg (DE); Rainer Gadow, Aschau am Inn (DE)

(73) Assignee: Universitat Stuttgart, Institut fur Fertigungstechnologie Kermaischer Bautelle, Stuttgart (DE)

( * ) Notice: Subject to any disclaimer, the term of this patent is extended or adjusted under 35 U.S.C. 154(b) by 0 days.

(21) Appl. No.: 09/889,108

(22) PCT Filed: Jan. 14, 2000

(86) PCT No.: PCT/EP00/00253
§ 371 (c)(1),
(2), (4) Date: Nov. 28, 2001

(87) PCT Pub. No.: WO00/41982
PCT Pub. Date: Jul. 20, 2000

(30) Foreign Application Priority Data

Jan. 14, 1999 (DE) .......................... 199 01 215

(51) Int. Cl.$^7$ .......................... F16D 65/10; F16D 65/12
(52) U.S. Cl. .......................... 188/251 A; 188/218 XL; 188/73.2; 192/107 M; 428/293.4
(58) Field of Search .................. 188/218 XL, 251 R, 188/251 A, 251 M, 73.1, 73.37, 250 G, 250 B, 73.2, 18 A; 192/107 M, 70.14, 107 R; 428/293.4, 293.1, 294.1, 294.4; 501/95.1–95.3; 156/89.26, 89.25, 167, 180, 89.11, 89.13

(56) References Cited

U.S. PATENT DOCUMENTS

| | | | | |
|---|---|---|---|---|
| 3,661,235 A | * | 5/1972 | Harrison | 188/218 XL |
| 4,992,318 A | * | 2/1991 | Gadkaree | |
| 5,077,243 A | * | 12/1991 | Nakano et al. | |
| 5,242,746 A | * | 9/1993 | Bommier et al. | 188/251 R |

(List continued on next page.)

FOREIGN PATENT DOCUMENTS

| | | | |
|---|---|---|---|
| DE | 1813850 | * | 7/1970 |
| DE | 1940669 | * | 2/1971 |
| DE | 4235589 | * | 4/1994 |
| DE | 4438456 | * | 5/1996 |
| DE | 19651798 | * | 6/1998 |
| DE | 19711829 | * | 9/1998 |
| DE | 19711831 | * | 9/1998 |
| DE | 19721473 | * | 12/1998 |
| DE | 19901215 | * | 7/2000 |
| EP | 0 459916 | * | 12/1991 |
| EP | 0 699 845 | * | 3/1996 |
| GB | 1267280 | * | 3/1972 |
| GB | 1528114 | * | 10/1978 |
| JP | 63-210065 | * | 8/1988 |
| JP | 10-182256 | * | 7/1998 |
| WO | WO 93/11185 | * | 6/1993 |
| WO | WO 98/42634 | * | 10/1998 |
| WO | WO 98/42635 | * | 10/1998 |

OTHER PUBLICATIONS

Translation of WO 93/11185.*
Translation of EPO 699845.*
Translation of German 1813850.*
Translation of JP 63–210065.*

*Primary Examiner*—Douglas C. Butler
(74) *Attorney, Agent, or Firm*—Antonelli, Terry, Stout & Kraus, LLP

(57) ABSTRACT

The invention relates to a fiber-reinforced ceramic body and a method for producing same. The ceramic body consists of a core and a boundary layer (93, 94) which is joined to the core and has at least one outer surface (96, 97) which can preferably be subjected to tribological stress. The core consists of one or more layers (92) of which at least one is reinforced with long fibers. The boundary layer (93, 94) is reinforced with short fibers. The fibers are preferably reaction-bonded in a matrix by melt infiltration and are made of high-temperature resistant fibers with covalent bonds on the basis of silicon, carbon, boron or nitrogen.

16 Claims, 6 Drawing Sheets

U.S. PATENT DOCUMENTS

| | | | |
|---|---|---|---|
| 5,525,558 A | * | 6/1996 | Niwa et al. |
| 5,779,006 A | * | 7/1998 | Hyde et al. ............. 188/250 G |
| 5,972,157 A | * | 10/1999 | Xue et al. |
| 6,035,978 A | * | 3/2000 | Metzen et al. ........ 188/218 XL |
| 6,042,935 A | * | 3/2000 | Krenkel et al. ........ 192/107 M |
| 6,077,607 A | * | 6/2000 | Zornik ................. 188/218 XL |
| 6,193,027 B1 | * | 2/2001 | Krenkel et al. ....... 188/218 XL |
| 6,217,997 B1 | * | 4/2001 | Suyama et al. |
| 6,234,282 B1 | * | 5/2001 | Martin ................. 188/218 XL |
| 6,261,981 B1 | * | 7/2001 | Dietrich et al. |
| 6,284,357 B1 | * | 9/2001 | Lackey et al. |
| 6,350,713 B1 | * | 2/2002 | Petrak ....................... 501/95.2 |
| 6,386,341 B1 | * | 5/2002 | Martin ................. 188/218 XL |
| 2002/0142146 A1 | * | 10/2002 | Godow et al. |
| 2002/0179225 A1 | * | 12/2002 | Behr et al. ............... 156/89.13 |

* cited by examiner

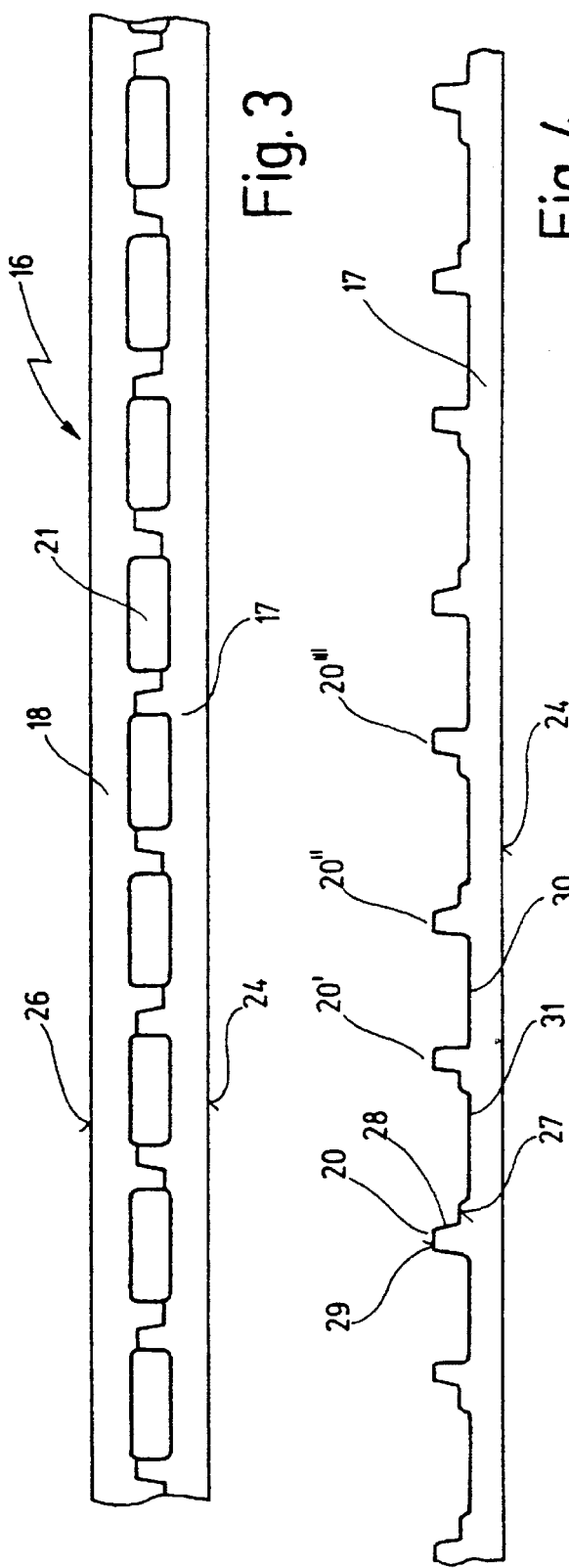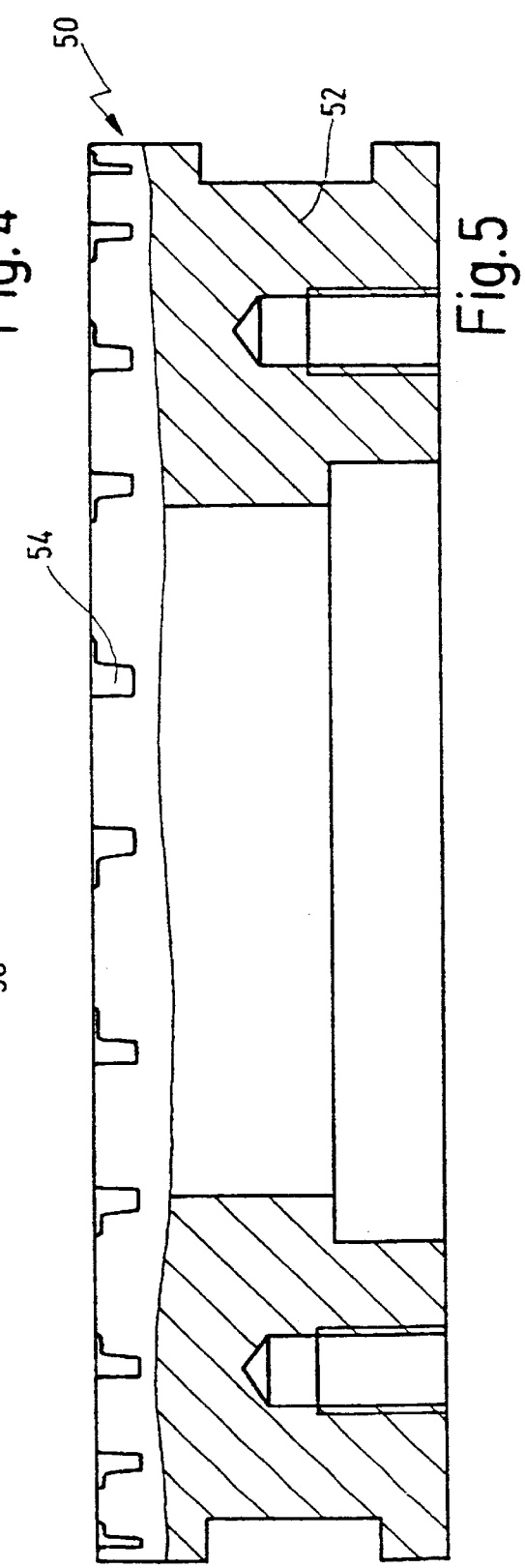

FIBRE-REINFORCED CERAMIC BODY AND METHOD FOR PRODUCING SAME

This is a 371 of international application No. PCT/EP00/00253, filed Jan. 14, 2000.

The present invention relates to a fibre-reinforced ceramic body and a method for producing the same, in particular a brake disc of fibre-reinforced ceramic material and a method for producing the same.

Fibre-reinforced ceramic bodies and methods for producing them are known. For example a brake disc is known from DE-A-44 45 226 that is produced from a carbon fibre-reinforced material in two halves as an internally ventilated brake disc with radial ventilation channels.

The two surfaces of the brake disc are formed as friction surfaces. Ribs are formed on the inside of at least one half that rest on the other half with the formation of free ventilation channels arranged therebetween. Both halves are rigidly joined to one another by a suitable joining method, such as for example high-temperature brazing or an adhesion method process. A pot-shaped flange that is either formed integrally with one half or is connected via bolts or other joining elements to the brake disc serves for the purposes of securing to the wheel.

Such brake discs may consist for example of a carbon fibre-reinforced carbon (CFC) and have been used for some years with specially developed friction linings in motor racing. The area of use of CFC materials is however limited on account of the susceptibility of the carbon fibres to oxidation starting at about 500° C. Moreover, further composite ceramic materials have become known, from which such brake discs or other ceramic bodies can be produced (see for example DE-A-197 11 831). In this connection long fibre-reinforced or short fibre-reinforced CFC materials are used as preliminary bodies, which are then melt infiltrated with liquid silicon. Reaction-bonded carbon fibre-reinforced SiC ceramics are thereby formed.

In general fibre-reinforced ceramic materials are used as high performance materials in machine construction and plant construction and in aeronautics and space technology. A good tolerance to damage and resistance to thermal shock and oxidation, in addition to a very high specific strength and rigidity, are desired in such applications. The aforementioned properties are restricted when using long fibres since an oxidative attack can penetrate into the interior of the structural part and thereby lead to destruction if the critical crack length is exceeded.

In the case of short fibre-reinforced ceramic bodies with reaction-bound fibres based on Si/C/B/N according to DE-A-197 11 831, a better oxidation stability can, in fact, be achieved even at high temperatures since oxidation of the short fibres that are present in isolated form due to the ceramic matrix damage the structural part only on the surface. However, such ceramic bodies in many cases do not exhibit a sufficient tolerance of damage such as is required for certain high performance applications, for example for brake discs.

The object of the present invention is accordingly to provide an improved fibre-reinforced ceramic body and a method for producing such a body that is characterised by a high tolerance of damage, high strength, and high temperature resistance. In this connection, it should be possible to produce a surface that is as gas-tight and/or liquid-tight as possible to ensure a good corrosion resistance.

This object is met by a fibre-reinforced ceramic body with a novel structure that consists of a core and a boundary layer that is joined to the core and has at least one outer surface that can preferably be subjected to tribological stress, with the core being composed of one or more layers, of which at least one is reinforced with long fibres, and wherein the boundary layer is reinforced with short fibres.

With regard to the above method, this object is achieved by a method in which a core is produced from at least one layer that is reinforced with long fibres and the core is joined to a boundary layer that is reinforced with short fibres and has at least one outer surface that can preferably be subjected to tribological stress.

The object of the invention is fully achieved in this way. According to the invention a high tolerance damage is in fact achieved by means of the core that is reinforced with long fibres, while on the other hand a high temperature resistance can be achieved by means of the boundary layer reinforced with short fibres since the said boundary layer can be made gas-tight and liquid-tight by a large proportion of ceramic matrix and by using short fibres, with the result that a good corrosion resistance can be achieved also at temperatures above 500° C.

In a further modification of the invention the core has a plurality of layers reinforced with long fibres (UD layers), whose long fibres are in each case arranged in a preferred direction, with the preferred directions of at least two UD layers being arranged angularly displaced relative to one another.

In this connection, layers with woven long fibres may additionally be provided, which are preferably arranged between adjacent UD layers in order to counteract delamination.

The strength properties of the ceramic structural part can be purposely influenced by means of the combination of a plurality of UD layers arranged at an angle relative to one another and optionally layers of woven long fibres (cross-ply layers), in order thereby to achieve a particularly high strength in the specific stress directions acting on the ceramic structural part and at the same time ensure a good tolerance of damage.

In this connection the short fibres are preferably arranged statistically distributed in the boundary layer.

In order to achieve such a homogeneous distribution of the short fibres, a granulation method may for example be employed.

The term long fibres within the scope of the present application is understood to mean fibres having a length of at least 50 mm, while the term short fibres is understood to mean fibres having a length of less than 50 mm.

Such fibres are used, as a rule, in the form of fibre bundles (so-called rovings), which generally consist of ca. 3,000 to 25,000 individual filaments. 12K rovings, which consist of about 12,000 individual filaments, are widely available commercially.

All fibres that have a sufficiently high strength even at high temperatures, as long as exclusion of air is ensured, are suitable as fibres for reinforcing the ceramic structural part. Such fibres are as a rule those with a covalent bond based on silicon, carbon, boron and/or nitrogen. SiC fibres, C fibres or SiBCN fibres may preferably be used as fibres.

In an advantageous development of the invention the fibres are reaction-bonded with a matrix that may, in particular, consist of silicon carbide. The use of such a matrix material permits an advantageous production and at the same time provides a good gas-tightness in the boundary layer, and, furthermore, problems that may arise due to shrinkage during production can be largely avoided.

Such a ceramic body may be designed and fabricated as a brake disc for an internally ventilated disc brake, and may comprise two halves joined to one another, each half having an outer surface formed as a friction surface and an inner surface, wherein at least one half has on the inner surface ribs that rest on the other half, and wherein on the inner surfaces of both halves ribs are provided that run substantially radially and that engage positively between corresponding ribs of the respective other half.

With such a design of a brake disc consisting of two halves, the securing to the wheel can be considerably simplified due to the positive and material-locking connection of the interengaging ribs, since a relative rotation of the two halves can be effectively prevented by the said positive and material-locking connection. Accordingly, the securing of the brake disc to the wheel can be effected in a particularly simple manner, in which connection if necessary just a simple friction-locking connection may also be used in order to completely prevent the propagation of notch stresses into the brake disc. Overall, the stability of the brake disc consisting in such a way of two halves is furthermore substantially improved compared to known brake discs.

In a preferred modification of the invention, ventilation channels are formed between the ribs of the one half and the ribs of the other half.

Such ventilation channels, which particularly when the brake disc is produced from a composite ceramic material are advantageous on account of the relatively poor thermal conductivity of the ceramic material, can be incorporated into the brake disc according to the invention without additional expenditure.

The ventilation channels may be designed straight and to run in a radial direction. In addition it is of course also conceivable for the ventilation channels to follow a curved, for example spiral, path.

In a preferred modification of the invention both halves of the brake disc are designed to be identical as regards shape and size.

The production costs involved in the manufacture of the brake disc can be significantly reduced by means of such a geometry. Thus, a single press tool can be used to produce both halves, thereby halving the tooling costs.

In a preferred modification of the invention each rib has a first supporting surface running in a radial plane, which changes via an inclined surface into a second supporting surface likewise running in a radial plane, the said second supporting surface being at a greater distance from the friction surface than the first supporting surface.

Such a design ensures in the brake disc an as good and uniform an application as possible of the braking pressures acting externally on the two friction surfaces, since due to the plane supporting surfaces large cross sections are available for the transmission of the force. The inclined surfaces provided therebetween, which may run either perpendicularly to the radial plane, inclined thereto or may also be formed as curved surfaces, serve for the positive engagement of one half on the other half.

According to an advantageous modification of the invention grooves that run substantially radially are formed on the inside of each half, between which grooves the ribs project, and wherein four ribs are in each case arranged in succession to one another in the circumferential direction in such a way that the first supporting surfaces of the first and of the adjacent second rib point towards one another, while the first supporting surfaces of the second and of the following third rib point away from one another, and the first supporting surfaces of the third and of the following fourth rib again point towards one another.

By means of such an arrangement it is possible for both halves to be identical in both shape and size. However, in principle other geometries that permit an identical design and arrangement of the two halves is also conceivable.

In a preferred modification of the invention, the brake disc has a central securing opening for securing by means of a flange to a wheel, with the friction surfaces being designed so as to be continuously planar to the friction-locking connection with the flange or have grooves starting from the securing opening for the positive connection with the flange.

This arrangement has the advantage that with just a friction-locking connection between the flange and the brake disc, no types of notch stresses are transmitted from outside to the brake disc. However, it is in principle also possible to use grooves starting from the securing opening for the positive connection with the flange, if a continuously positive connection is desired between both halves of the brake disc and the mounting on the wheel.

A brake disc according to the invention can be used in a manner known per se in a brake disc that has a brake saddle that externally encloses a specific region of the said brake disc on both sides and that has brake linings that can be pressed against the friction surfaces.

In a preferred modification of the invention the ribs of the brake disc are spaced apart from one another in such a way that the brake linings cover at least two ribs of the brake disc.

Such a design ensures that the pressing force acting from both sides on the brake disc is applied as uniformly as possible to the brake disc and that buckling or bending moments are largely avoided.

In an advantageous modification of this embodiment the flange has two partial flanges that in each case partially cover the friction surfaces of the brake disc with a plane annular surface on the inside, and wherein clamping means are provided for tensioning the partial flanges against one another, in order to ensure a friction-locking connection between the brake disc and the inner flange.

In this way a particularly smooth torque transmission between the brake disc and the wheel is ensured without notch stresses possibly being transmitted to the brake disc by bolts or the like, this having a particularly advantageous effect on safeguarding against the danger of fracture in production from composite ceramic materials.

According to an alternative embodiment grooves starting from the connection opening are provided on at least one friction surface, corresponding flange webs positively engaging in the said grooves.

Such a design is advantageous if a continuously positive connection between the two halves of the brake disc and the securing to the wheel is desired.

In a modification of the production process according to the invention the composite ceramic material is produced by the following steps:
  production of a prepreg formed from at least one layer of long fibres which is mouldable while under the action of heat while subject to the addition of organic precursors and preferably while subject to the addition of fillers;
  production of a mixture formed from short fibres and organic precursors which is mouldable while subject to the action of heat preferably under the addition of fillers;
  introduction of at least one prepreg together with a layer consisting of the mixture into a mould and compression under the action of heat to produce a green product;
  pyrolysis of the green product to produce a porous moulded body;
  melt infiltration of the porous moulded body with a melt, preferably with a silicon melt, to produce a moulded body with reaction-bonded fibres.

In this way the production of the ceramic body can be considerably simplified since the prepreg can be produced by means of a standardised production process and then only has to be moulded to the desired shape under the action of heat together with the mixture containing short fibres. The moulded body formed in this way can be fabricated roughly having its final contour and shape, so that after the subsequent pyrolysis and melt infiltration only a minor post-treatment is necessary.

In this connection preferably a plurality of prepregs, which may contain long and/or short fibres, are assembled to form a laminate that is then shaped in the mould under the action of heat.

In this connection the mixture of short fibres and organic precursors, to which fillers are preferably added, may either be incorporated into one or several prepregs and then laminated with the prepregs reinforced with long fibres, or may be produced separately, for example by synthesis granulation, in order to obtain a boundary layer as homogeneous as possible reinforced with short fibres.

The mixture from which the boundary layer is produced may also already be incorporated into the relevant outer layer of the long fibre prepreg. In order to achieve greater layer thicknesses, several prepregs that are reinforced exclusively with short fibres are preferably used. Thus, a plurality of prepreg layers may be laminated (placed over one another) and optionally various UD layers and woven layers may be combined with one another by laying various prepregs on top of one another.

In principle various processes may be used to produce the prepreg.

A particularly favourable process for producing a prepreg according to the invention has proved to be the SMC ("sheet moulding compounding") method which in principle is already known for producing glass fibre-reinforced composite materials but not however for producing fibre-reinforced ceramic materials.

For this purpose a carrier film is unwound from a storage roll, an organic precursor and fibres are then added from above to the carrier film, finally a further organic precursor and a further carrier film are added from above, and the material enclosed between the two carrier films is compacted and wound onto a storage roll. The precursor is next aged, which may take place at room temperature over a period of a few hours to several days, in order thereby to achieve a thickening effect and/or a partial crosslinking. After sufficient ageing of the precursor, the two carrier films may be removed from the two sides of the prepreg and the prepreg may then be cut into sections for the production of the green product. By laminating several prepregs a multi-layer structure is obtained that is compressed in a suitable mould.

According to the SMC process the fibres are unwound in the form of long fibres together with the organic precursor. If short fibres are to be produced, the fibres may also be cut to the desired length by means of a cutting device (chopper) during the prepreg production, following which they are incorporated into the organic prepreg layer.

In this connection it is possible to combine a long fibre-reinforced layer with a short fibre-reinforced layer in a single production process.

Alternatively, the short fibre-reinforced layer for the boundary region may of course also be produced in a different way (for example by granulation) and then combined later with the long fibre-reinforced prepreg.

A further variant of the production of a green product is the so-called RTM process, which is likewise known for the production of glass fibre-reinforced plastics.

According to this process variant a fibre framework of long fibres is placed in a mould, an organic precursor is next injected into the mould under pressure, and the whole is moulded. According to the invention at least one layer comprising a mixture of organic precursor and short fibres and optionally fillers is now applied to the body formed in this way, the said body then being post-moulded in a mould under the action of heat before the green product thereby produced is pyrolysed and finally melt infiltrated. As an alternative it is also conceivable to inject short fibres together with the organic precursor into the mould.

In this way the shaping and the fibre-matrix integration is thus carried out in one stage.

A pitch or a resin, in particular a phenol resin or a furan resin, is preferably used as organic precursor for the aforementioned processes.

A further variant in the production of a long fibre-reinforced prepreg is the so-called slip infiltration.

To this end long fibre rovings are unwound and infiltrated by means of an immersion process with a slip consisting of an organic or organometallic precursor, preferably a polysilane, a polysiloxane or a polycarbosilane, as well as with solvents and fillers, and then wound onto a plaiting core.

The prepreg produced in this way may then be combined with short-fibre reinforced compositions in a pressing tool and next processed further in the already described manner, in order to produce a suitable structure having short fibre-reinforced and long fibre-reinforced layers.

The previously described production process may be used for example to produce a one-piece brake disc or an internally ventilated brake disc that is composed of two halves.

If the brake disc is produced from two halves, then preferably at least one prepreg that has at least one long-fibre-reinforced layer is introduced together with a short fibre-reinforced mixture into a pressing tool and is compressed, under the action of heat, to produce a first half of the brake disc, while at least one further prepreg is introduced into preferably the same pressing tool and is compressed under the action of heat in order to produce the second half of the brake disc. The two halves are then pyrolysed under the exclusion of air to produce a porous moulded body that is next melt infiltrated with a reactive melt, preferably with a silicon melt.

By joining the two halves before the pyrolysis and melt infiltration with a silicon melt of the porous moulded body produced by pyrolysis, a particularly intimate joining of the two halves to one another is achieved since to some extent fibres of one half hook onto the surface of the other half and during the subsequent melt infiltration even both halves are to some extent joined to one another in a material-locking manner by means of the continuous metallic inclusions that have penetrated into the porous skeleton of both halves. Moreover, a particularly intimate joining of the two halves is achieved by the mechanism of the reaction bonding between silicon and carbon. During the melt infiltration SiC also present in the green product at least partially redissolves and separates out as secondary SiC during the subsequent cooling, which in addition improves the bonding of the two halves.

It is understood that the expression "silicon melt" is also understood to mean such a melt that contains, in addition to silicon, alloyed constituents, in particular iron and chromium, which is particularly preferred on account of the considerably reduced internal stresses as a result of volume changes, as is discussed in detail in DE-A-197 11 831.

It is understood that both the remaining aforementioned features and the following features still to be discussed in detail may be used not only in the combination specified in each case, but also in other combinations or even alone, without going beyond the scope of the present invention.

Embodiments of the invention are illustrated in the drawings and are discussed in more detail in the following description, in which:

FIG. 3 is a partial view, in an enlarged representation, of a modification of the brake disc according to the invention viewed from the front;

FIG. 4 is one half of the brake disc according to FIG. 3, and, for the purposes of a better recognition, without the second half of the brake disc;

FIG. 5 is a mould half of a pressing tool for producing a brake disc according to the invention;

FIG. 10 is a partial section, on a greatly increased scale, through one half in the region of a rib in which the configuration of individual layers is shown;

Figure 1:
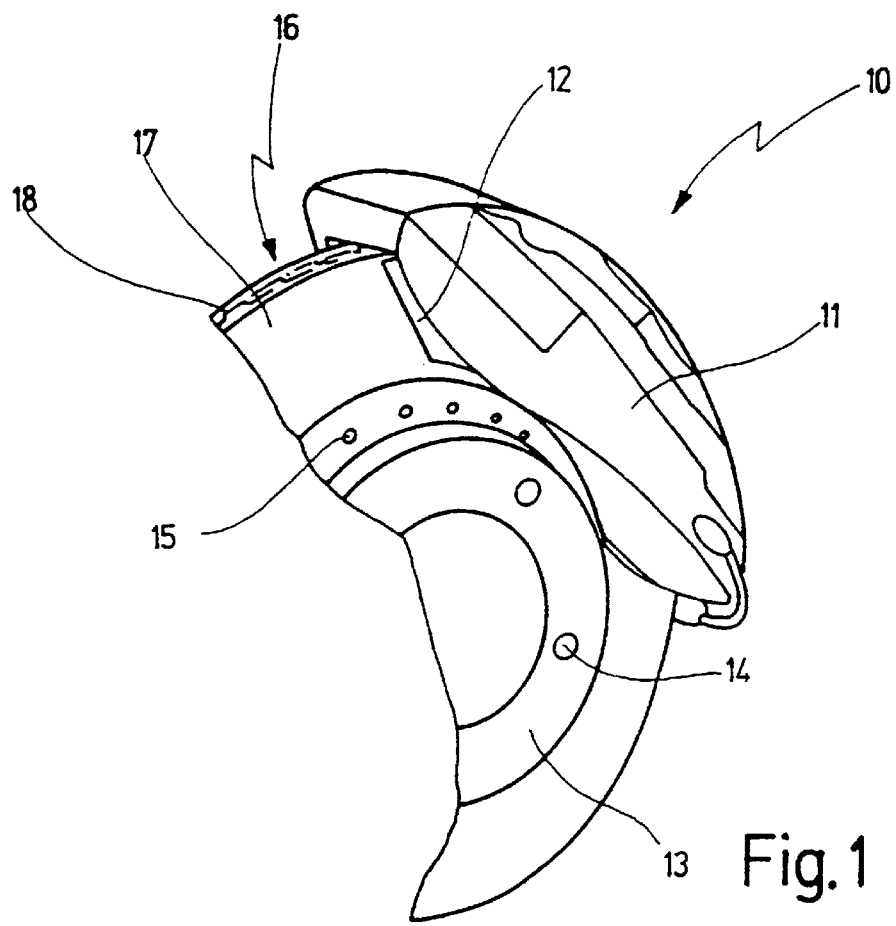
FIG. 1 is a perspective partial view in a simplified representation of a disc brake with a brake disc according to the invention.

FIG. 1 is a perspective partial representation of a disc brake, which is identified generally by the reference numeral 10. The disc brake 10 comprises a brake disc, identified generally by the reference numeral 16, which consists of two halves, namely a first half 17 and a second half 18, and is provided with radial ventilation channels so as to form an internally ventilated disc brake.

In order to secure the brake disc 16 to the wheel a pot-shaped flange is provided, identified overall by the reference numeral 13, which is joined to a second partial flange (not shown) arranged on the rear side of the brake disc 16, via clamping means 15, which may for example be rivets. For the purposes of securing to the wheel, bores 14 through which wheel nuts may be screwed on, are provided on the front side of the flange 13.

In addition FIG. 1 also shows diagrammatically the brake saddle 11 in which brake linings 12 are arranged on both sides of the brake disc 16, the linings being pressed hydraulically from both sides against the brake disc 16 in order to actuate the brake.

Figure 2:
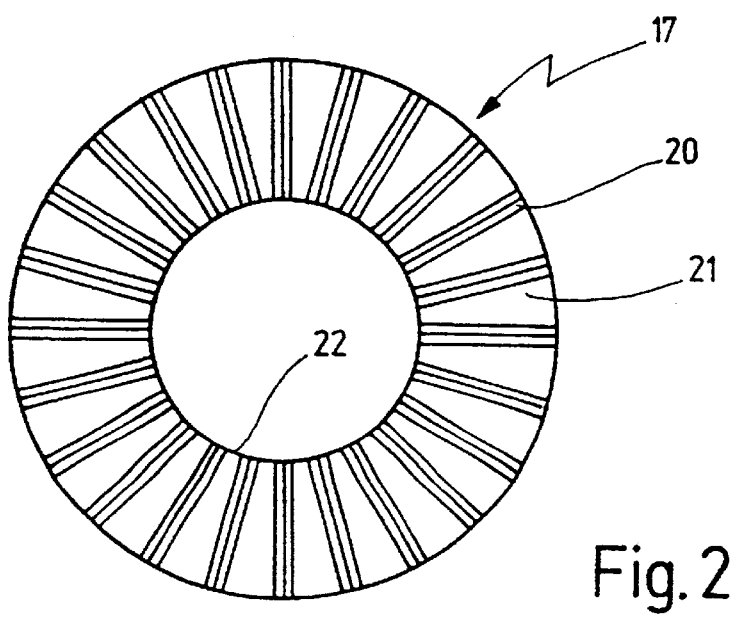
FIG. 2 is a plan view of one half of the brake disc according to FIG. 1.

As previously mentioned, the brake disc 16 consists of two halves, 17, 18, one of which halves 17, viewed from the inside, is illustrated in FIG. 2.

In FIG. 2 a cental circular securing opening 22 can be recognised. Furthermore, it can be seen from FIG. 2 that a plurality of radially running ribs 20 extend at regular interspacings over the annular surface of the half 17, radially running ventilation channels 21 being formed between adjacent ribs 20.

The shape and arrangement of these ribs and ventilation channels will be discussed in more detail hereinafter with the aid of FIGS. 3 and 4.

As can be seen from FIG. 3, which illustrates on the front face on an enlarged scale a modification of the two halves 17, 18 joined to one another, the said halves 17 and 18 are formed so that the ribs of the two halves 17, 18 engage positively with one another and the ventilation channels 21 are formed therebetween.

For this purpose the two halves 17, 18 are identical in both shape and size and may thus be produced using a single pressing tool. The shape of the ribs is best seen from the representation of the developed view of the half 17 shown in FIG. 4.

Each rib 20, 20', 20'', 20''' has a first supporting surface 27 running in a radial plane, which changes via an inclined surface 28 into a second supporting surface 29 that similarly runs in a radial plane. The inclined surface 28 between the two supporting surfaces 27, 29 may, as shown in FIG. 4, be inclined for example at an obtuse angle relative to the radial plane, but may also be perpendicular to a radial plane. Furthermore it is conceivable for the inclined surface 28 between the two supporting surfaces 27, 29 also to be curved. Moreover the supporting surfaces 27, 29 too may of course also be curved. The side of the half 17 facing the ribs is thus formed as a plane friction surface 24. The first supporting surfaces 27 have a smaller interspacing from the friction surface 24 than the second supporting surfaces 29. Overall, each rib 20, 20', 20'', 20''' thus has a roughly step-shaped appearance.

The arrangement of adjacent ribs is devised in such a way that in each case two adjacent ribs in the circumferential direction, for example the ribs 20 and 20', run so that their first supporting surfaces 27 face one another. A broad groove 31 running in a radial direction is formed between these first supporting surfaces 27. The second rib 20' is now formed so as to be a mirror image of its following adjacent rib 20'', i.e. the first supporting surfaces 27 of the rib 20' and of the following rib 20'' do not point towards the groove 30 formed between the two ribs 20', 20'', but instead point towards the first rib 20 and to the following rib 20'''.

In this connection the groove 30 between the ribs 20', 20'' is narrower than the groove 31 between the ribs 20, 20', although the base of the groove 30 has the same width as that of groove 31 since both halves 17, 18 complement one another, with the result that overall all the ventilation channels 21 have the same shape and size.

It is understood that the ventilation channels 21, which according to FIG. 2 run in the radial direction, may also have a curved shape instead of a straight shape, i.e. may for example run spirally.

FIG. 5 shows a cross-section through a mould half 52 of a pressing tool identified overall by the reference numeral 50 for producing the two halves 17, 18 of the brake disc 16. In this connection grooves 54 that have a shape complementary to that of the ribs in order to produce the said ribs are formed in the surface of the mould half 52.

The other mould half of the pressing tool 50 then has a suitable annular recess for producing the flat friction surface.

A particular advantage of the countouring of the two halves 17, 18 is that one and the same pressing tool 50 may be used to produce both halves 17, 18.

Figure 6:
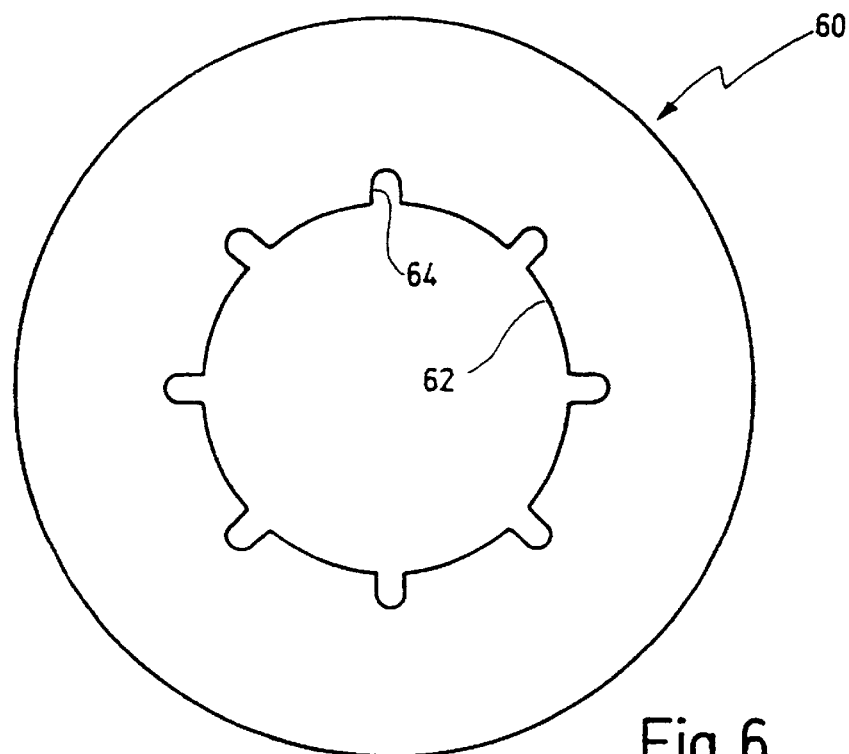
FIG. 6 is a plan view of a modification of the brake disc according to the invention.

In order to be able to secure the brake disc in a positive manner to the wheel, as can be seen from FIG. 6 grooves 64 starting from a central opening 62 of the brake disc 60 are provided that extend radially outwardly by a small amount and that preferably have a semicircular closure at their end. Corresponding webs of a mounting then engage in these grooves 64, by means of which the brake disc 60 is mounted on the wheel.

Figure 7:
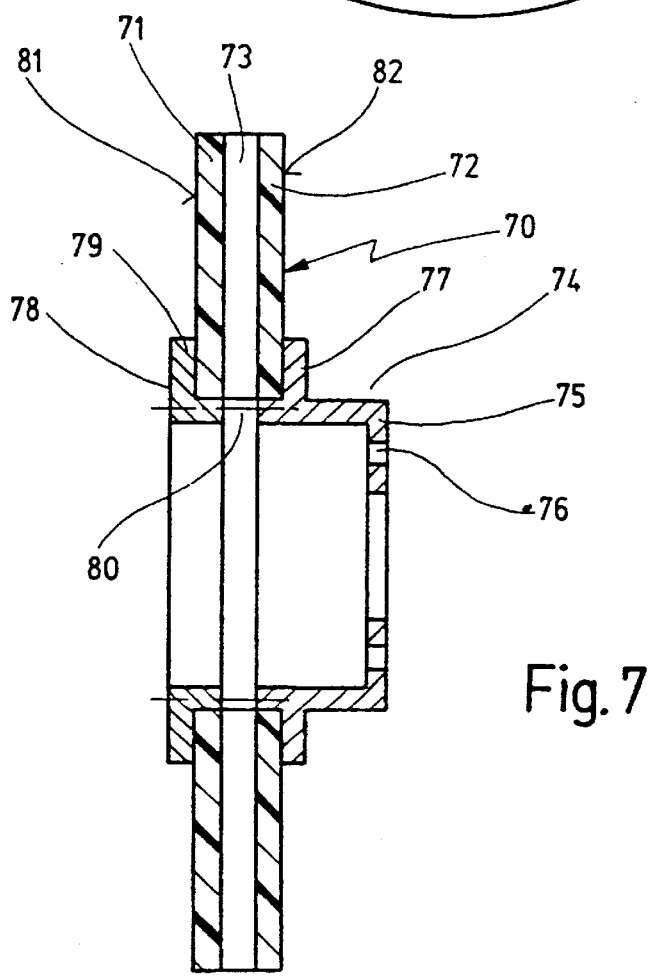
FIG. 7 is a section through a further embodiment of a brake disc according to the invention together with a flange for the securing of the latter.

An alternative to the above is illustrated in FIG. 7.

In this case the brake disc, identified overall by the reference numeral 70, and which consists of the two halves 71 and 72, is simply mounted in a friction-locking manner on a flange 74 consisting of two partial flanges 75, 78. The first partial flange 75 is pot-shaped and has, similar to the representation shown in FIG. 1, a plurality of bores 76 on its outside that serve for securing by means of wheel nuts. In addition this first partial flange 75 has an outwardly projecting annular web 77 by means of which this partial flange 75 rests against the friction surface 82 of the half 72. A second partial flange 78 is provided on the opposite side, which rests by means of an annular web 79 against the friction surface 81 of the half 71. Both partial flanges 75, 78 are clamped together by means of connecting elements 80, for example by bolts, so that the two annular webs 77, 79 are pressed against the friction surfaces 81, 82, thereby ensuring a friction-locking connection between the flange 74 and the brake disc 70.

In this connection the pressing force between the two partial flanges 75, 78 simply needs to be sufficiently large that the maximum possible braking moment can be transmitted.

Figure 8:
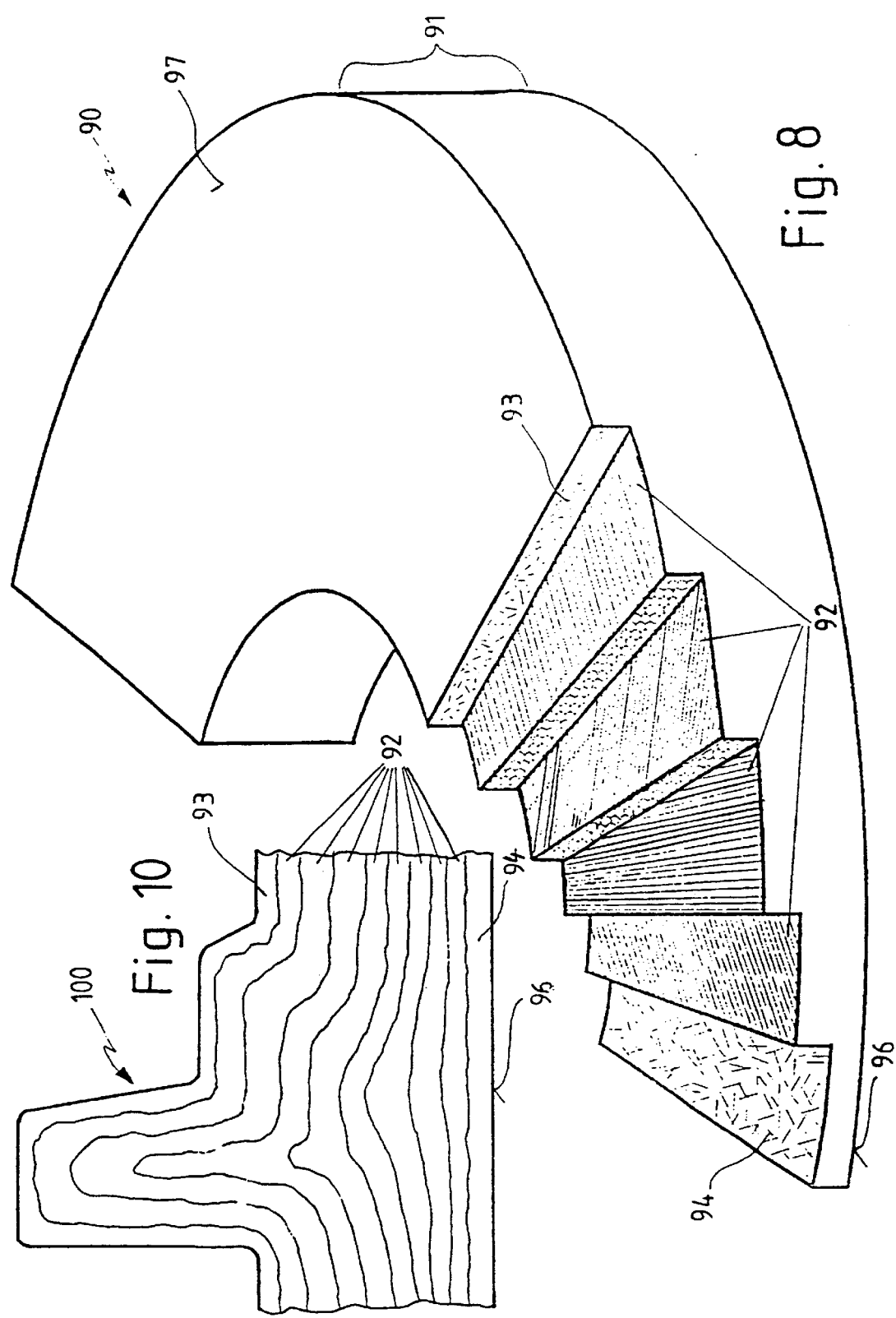
FIG. 8 shows the basic structure of a prepreg in a perspective, partially sectional enlarged representation.
Figure 9:
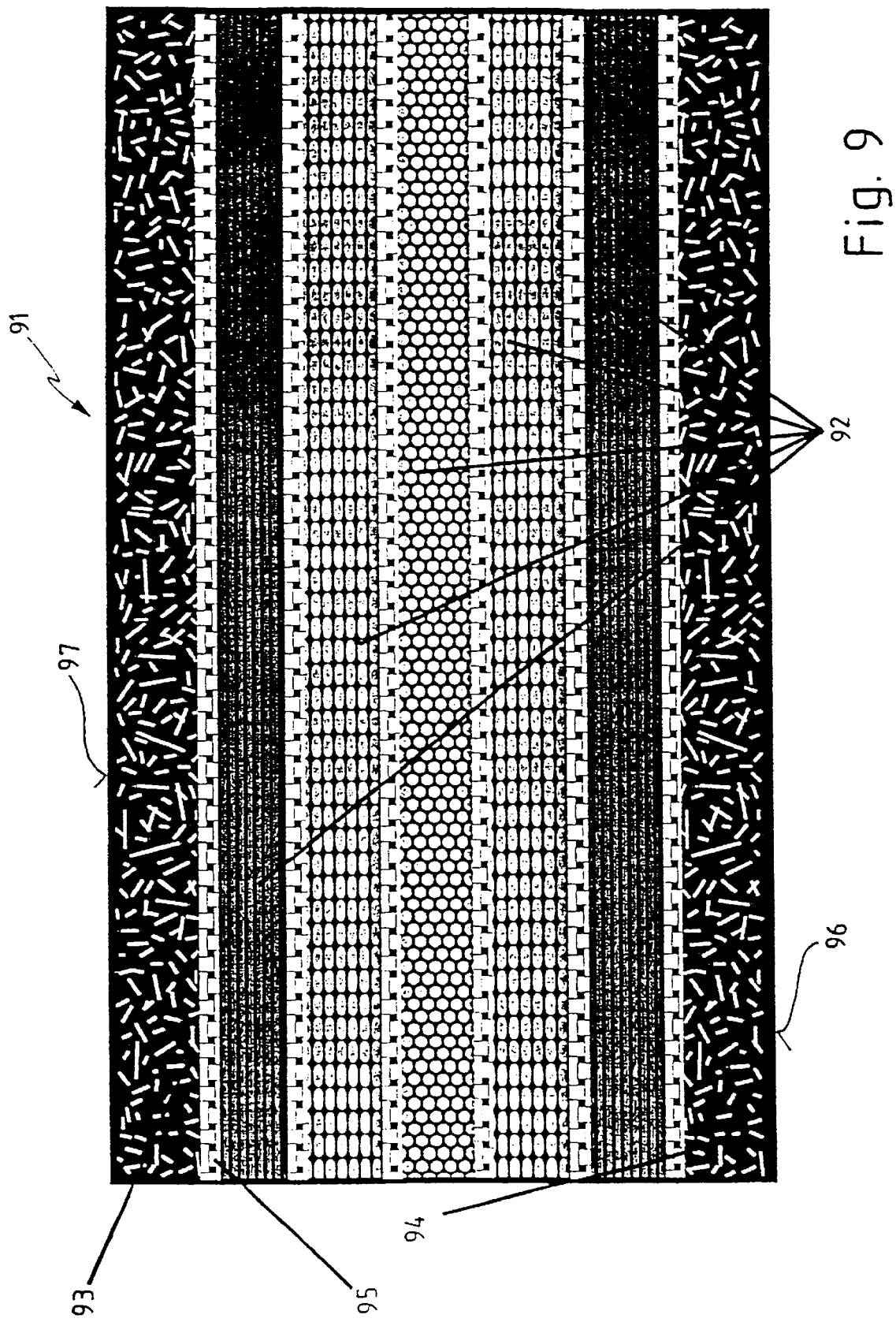
FIG. 9 is a diagrammatic representation of a prepreg in cross-section on an enlarged scale.

Such a brake disc, or generally such a moulded body, is laminated from individual fibre layers, as is described for example with the aid of FIGS. 8 to 10.

In this connection preferably so-called prepregs are used that contain one or more laminate layers. These may be UD layers, which are preferably arranged in each case angularly displaced relative to one another, for example are in each case spatially displaced 45° relative to one another, and/or are cross-ply layers (woven layers)

A laminate consisting of several such prepregs is shown in FIGS. 8 and 9 and is identified overall by the reference numeral 91.

According to FIG. 8 a total of four UD layers are shown diagrammatically, which are arranged angularly displaced relative to one another. In each case a layer 93 and 94, which preferably contains statistically distributed short carbon fibre bundles, is joined respectively to the upper side and to the lower side of the laminate 91.

Whereas the UD layers 92 reinforced with long fibres provide the necessary tolerance to damage, the two layers 93 and 94 reinforced with short fibres in each case produce a particularly wear-resistant and gas-tight and liquid-tight boundary layer whose outer surface 96, 97 is formed as a later friction layer for a brake lining.

In addition woven layers 95 may be provided between the individual UD layers 92, as is illustrated diagrammatically in FIG. 9.

However, for reasons of low-cost production the incorporation of such layers of woven material is as a rule omitted.

From FIG. 10, which shows a half 100 produced from such a laminate 91, it is clear that the layers 92 to 94 of the laminate 91 are in each case introduced as far as the ribs so that the UD layers and cross-ply layers run through the ribs and thereby ensure a good strength and good dimensional stability in the region of the ribs.

It is understood that the layer structure may be suitably adapted to the moulded body depending on the specific requirements, in order to ensure a high mechanical stability and tolerance to damage of the ceramic body as a whole and ensure a particularly high resistance to wear on the outer surfaces of the boundary layers.

Two possible manufacturing variants for the production of a prepreg are described briefly hereinafter with the aid of FIGS. 11 and 12.

Figure 11:
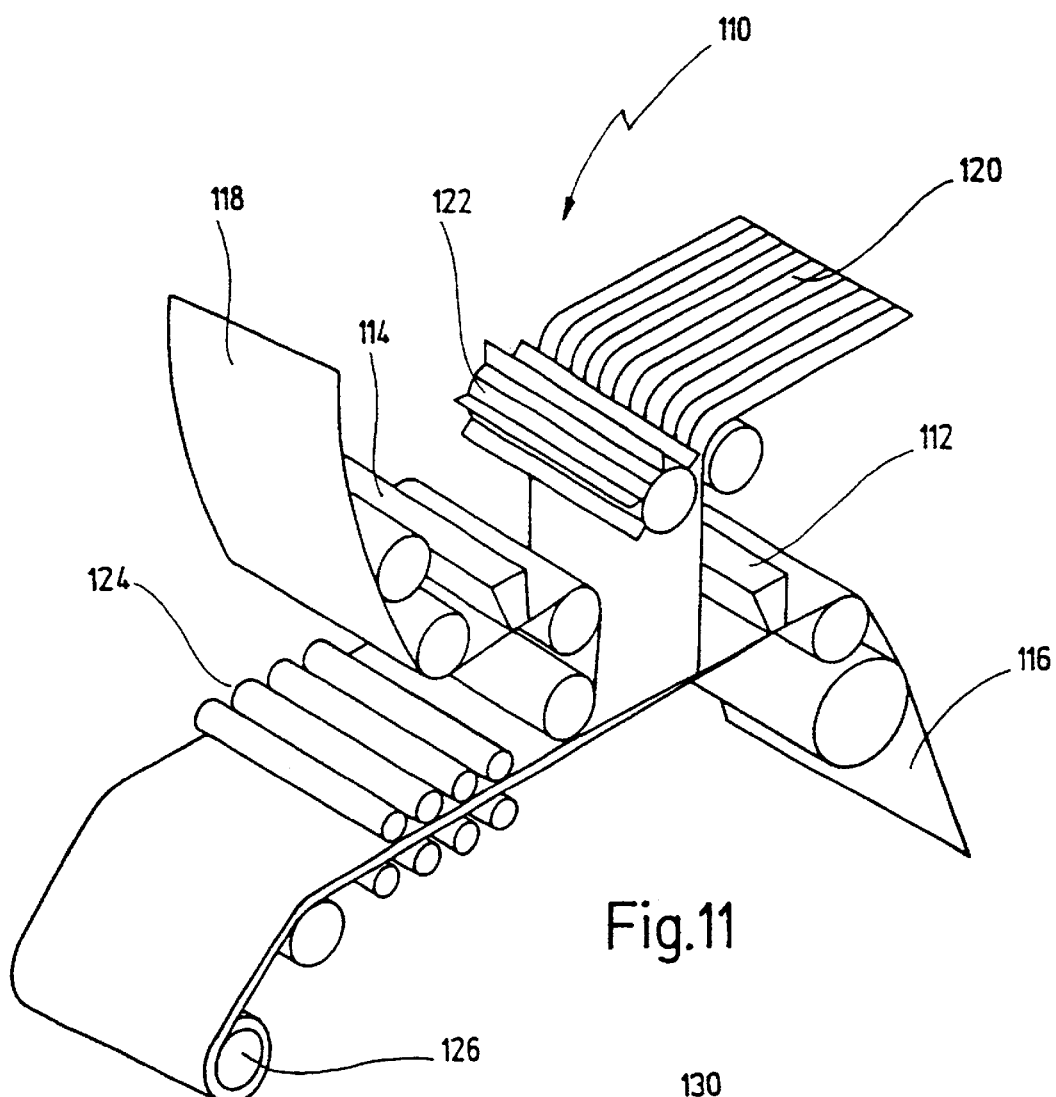
FIG. 11 is a diagrammatic representation of the production of a prepreg according to the SMC process.

FIG. 11 illustrates the production of a prepreg according to the SMC process, which is particularly preferred according to the invention. An SMC device is shown diagrammatically in FIG. 11 and is indicated overall by the reference numeral 110.

According to the SMC process, which is known per se for the production of glass fibre-reinforced plastics, fibres are embedded between two carrier films 116, 118 under the addition of organic binders, in order thereby to form a prepreg. The SMC device 110 has a series of rollers for this purpose, over which the lower carrier film 116 is guided. First of all an organic precursor, generally in the form of a phenol resin or furan resin, is added via a precursor box 112. Fibres 120, which are unwound as rovings from a fibre storage roll (not shown) are then added, and a further precursor layer is added from above via a further precursor box 114, onto which layer an upper carrier film 118 is applied. The layers with fibres 120 and precursor assembled in this way, which are enclosed between the two carrier films 116, 118, are then compacted by means of a roller unit 124 and afterwards wound onto a roll 126. Alternatively fibres 120, before being added, may be cut by means of a cutting device 122 into short fibres that are enclosed between the precursor layers. Fillers such as for example graphite, carbon black or SiC powder are preferably added to the precursor, which as a rule are phenol resins or furan resins (thermosets) or pitches.

It is therefore also possible using the illustrated SMC device to produce a prepreg that is reinforced simply with long fibres or simply with short fibres. It is understood that the device, described here only briefly, may also be modified in such a way that a long fibre layer is combined with a short fibre layer in a common prepreg layer.

After the composite that has thus been produced has been wound onto the roll 126, the next step is the ageing of the prepreg, which may take place at room temperature over a duration of several hours up to several days in order to achieve a thickening of the prepreg, which indicates a certain partial crosslinking of the precursor.

The two carrier films can then be removed and the prepreg can be processed further.

After the production of the prepreg, the latter is cut up to the appropriate size and/or several prepreg plies are placed on top of one another in a suitable manner and are then compressed and hardened in a suitable mould, for example in the pressing tool 50 at elevated temperature, which is generally of the order of magnitude between 100° and 200° C., a good filling of the mould being ensured by the plasticisation of the matrix resin at elevated temperature.

A green product produced in this way is heated in a pyrolysis furnace preferably under a nitrogen atmosphere (or methane atmosphere) at about 1,000° C. The organic binder constituents are thereby degraded to carbon with a reduction in volume. A porous moulded body is thereby produced. This carbonised moulded body obtained in this way is then infiltrated with a silicon melt, which may optionally contain additions of iron and chromium, in a graphite crucible in vacuo at about 1,600° C., as is known in principle from DE-A-197 11 831.

Figure 12:
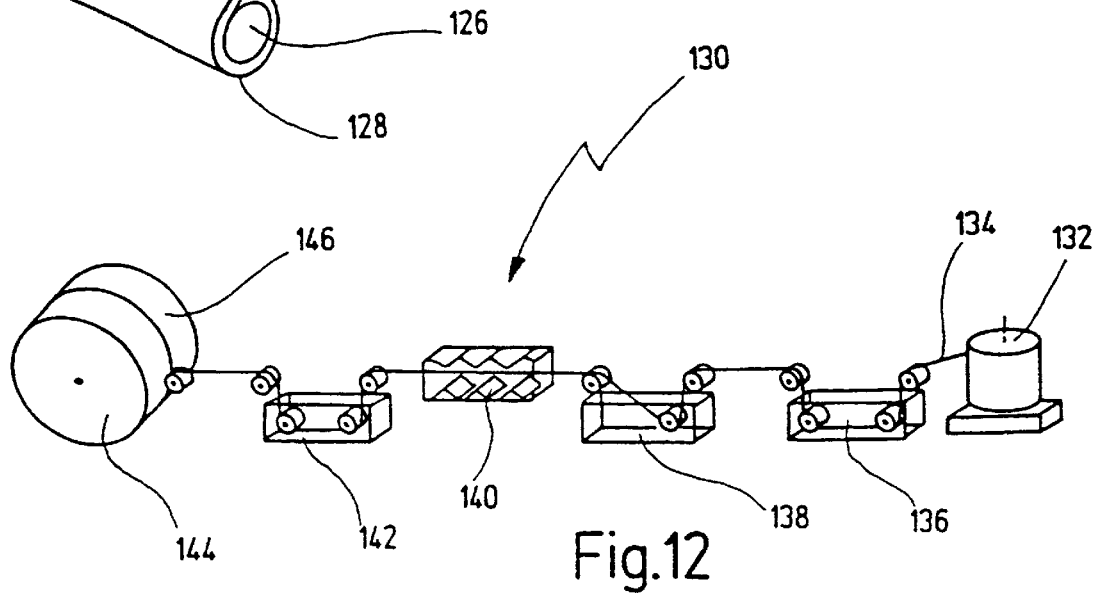
FIG. 12 is a diagrammatic representation of the production of a prepreg according to the slip infiltration process.

A further variant for the production of long fibre-reinforced prepregs is the use of a slip infiltration device, which is illustrated diagrammatically in FIG. 12 and is identified overall by the reference numeral 130.

For this purpose rovings 134 are unwound from a fibre uncoiling device 132, which are passed through a coating bath 136, a following precipitation bath 138, a drying section 140 and an infiltration bath 142, and are then deposited on a deposition core 144 on which the prepreg 146 is mounted. The above procedure is accordingly an immersion process using slip (consisting of precursor, fillers and solvents), by means of which the rovings 134 are infiltrated. The upstream coating bath 136, the precipitation bath 138 and the drying section 140 serve to perform a suitable pretreatment. Organic or organometallic precursors, preferably polysilanes, polysiloxanes or polycarbosilanes, are used as precursors.

Fillers, which may for example be SiC (inert) or reactive fillers such as carbide-forming agents (Ti, Al, Cr) or B, which latter is converted under an $N_2$ atmosphere to BN, are preferably mixed in with the precursors.

The prepregs produced in this way are then assembled together with short fibre compositions and hardened in a heated pressing tool. Pyrolysis then takes place (for example 36 hours at a maximum temperature of up to 1,400° C. under $N_2$ or in a vacuum). An organometallic precursor is thereby converted into mineral phases (α-SiC, C). The fillers also react if they are carbide-forming compounds or B. It is particularly favourable to use B as filler since a nitriding of the B (BN formation at a temperature above 1,400° C.) eliminates, through a marked increase in volume, any pyrolysis shrinkage.

For the production of a brake disc consisting of two halves according to FIGS. 3 and 4, the two halves, consisting for example of a laminate 91 of several prepregs produced according to the SMC process, are compressed in the same pressing tool 50 at elevated temperature. The two green products produced in this way are placed on top of one another and then pyrolysed together and finally melt infiltrated.

It is understood that the prepregs that are used may also simply consist of long fibre layers and that the at least one boundary layer, which contains short fibres, may be produced by means of a different process. The granules produced in this way, together with the prepreg, are then added to a suitable mould and compressed to produce the green product.

EXAMPLE

A solid brake disc of the shape shown in FIG. 6, of 280 mm external diameter and a thickness of about 13 mm, was produced from 12 long fibre UD prepregs and 16 short fibre prepregs. For this, three prepreg layers aligned at 0°, 90° and 45° (the angles refer in each case to the angle relative to the first layer) were laminated and two such composites were placed on top of one another in a mirror image arrangement. Two such laminates each of six layers were joined together. Eight short fibre prepregs were laminated onto each external side. All prepregs had been produced according to the SMC process and had a thickness of ca. 4 mm. The laminate composite formed in this way was moulded in a suitable, preheated pressing tool at about 150° C. under a pressure of 210 bar for 15 minutes. These conditions ensured an excellent filling of the mould. The green product formed in this way was removed from the pressing tool and heated in a furnace under a nitrogen atmosphere at a rate of about 50 K/hour to a temperature of about 1,100° C., and was kept for about 7 hours at this temperature to effect carbonisation. Next, the furnace was first of all cooled and then subjected to a vacuum. The green product was now heated in vacuo at a rate of 400 K/hour up to 1,400° C., then at a rate of 60 K/hour up to 1,650° C., and was silicised at the latter temperature with a pure silicon melt (without additives), the holding time being about 14 hours. The green product was then cooled at a rate of about 100 K/hour down to room temperature.

The brake disc produced in this way was characterised by a shape that was very close to the final contouring, and only had to undergo a post-treatment grinding. The brake disc had an excellent mechanical stability, thermal resistance and oxidation resistance, as well as favourable friction properties.

What is claimed is:

1. Fibre-reinforced ceramic body comprising a core and a boundary layer that is connected to the core and has at least one outer surface that can preferably be subjected to tribological stress, wherein the core is composed of one or more layers, of which at least one layer is reinforced with long fibres having a length of at least 50 mm, and wherein the boundary layer is reinforced with short fibres having a length less than 50 mm, the long fibres and short fibres being reaction bonded with a melt infiltrated matrix.

2. Ceramic body according to claim 1, in which the core has a plurality of layers (UD layers) reinforced with long fibres, whose long fibres are in each case arranged in a preferential direction, the preferential directions of at least two UD layers being arranged angularly displaced relative to one another.

3. Ceramic body according to claim 1, in which the core has at least one layer with woven long fibres or with short fibres.

4. Ceramic body according to claim 3, in which at least one layer reinforced with short fibres is arranged between two adjacent UD layers.

5. Ceramic body according to claim 3, in which a layer with woven long fibres is arranged between two adjacent UD layers.

6. Ceramic body according to claim 1, in which the short fibers are largely arranged in a statistically distributed manner.

7. Ceramic body according to claim 1, in which the long fibres and short fibres are formed as high temperature-resistant fibres with covalent bonding, based on silicon, carbon, boron and/or nitrogen, and are preferably formed as SiC fibres, C fibres or SIBCN fibres.

8. Ceramic body according to claim 1, characterised in that the melt-infiltrated matrix comprises silicon carbide.

9. Brake disc comprising the ceramic body according to claim 1, with two halves joined to one another, wherein each half has a surface formed as a friction surface and an inside, with ribs on the inside of at least one half being provided that rest against the other half, with substantially radially running ribs being provided on the insides of both halves that engage positively between corresponding ribs of the respective other half.

10. Brake disc according to claim 9, in which ventilation channels are formed between the ribs of one half and the ribs of the other half.

11. Brake disc according to claim 9, in which both halves are formed identically both as regards shape and size.

12. Brake disc according to claim 11, in which each rib has a first supporting surface running in a radial plane, which changes via an inclined surface into a second supporting surface running in a radial plane, which second supporting surface is at a greater distance from the friction surface than the first supporting surface.

13. Brake disc according to claim 11, characterised in that on the inside of each half substantially radially running grooves are provided between which the ribs project, and wherein in each case four ribs are arranged relative to one another in the circumferential direction so that the first supporting surfaces of the first rib and of the adjacent second rib point towards one another, while the first supporting surfaces of the second rib and of the following third rib point away from one another, and the first supporting surfaces of the third and of the following fourth rib again point towards one another.

14. Brake disc according to claim 9, with a central securing opening for securing to a wheel by means of a flange, with the friction surfaces being formed flat for friction-locking connection to the flange.

15. Brake disc according to claim 14, in which grooves starting from the securing opening are provided on at least one friction surface for the positive engagement with corresponding webs of the flange.

16. Ceramic body according to claim 1, wherein the long fibres and short fibres are reaction bonded by melt infiltration of silicon.

* * * * *